(12) United States Patent
Iwasaki

(10) Patent No.: US 6,447,939 B1
(45) Date of Patent: Sep. 10, 2002

(54) ELECTRICAL POWER DISTRIBUTION SYSTEM FOR A FUEL CELL VEHICLE

(75) Inventor: Yasukazu Iwasaki, Kanagawa-ken (JP)

(73) Assignee: Nissan Motor Co., Ltd., Yokohama (JP)

(*) Notice: Subject to any disclaimer, the term of this patent is extended or adjusted under 35 U.S.C. 154(b) by 0 days.

(21) Appl. No.: 09/563,854

(22) Filed: May 4, 2000

(30) Foreign Application Priority Data

May 6, 1999 (JP) .............................. 11-126040

(51) Int. Cl.[7] .................... H01M 16/00; H01M 8/04
(52) U.S. Cl. ............................ 429/9; 429/22; 429/23; 180/65.3
(58) Field of Search ............... 429/9, 22, 23; 180/65.3

(56) References Cited

U.S. PATENT DOCUMENTS

| | | | | |
|---|---|---|---|---|
| 5,334,463 A | * | 8/1994 | Tajima et al. ................ | 429/9 |
| 5,366,820 A | * | 11/1994 | Tsutsumi et al. ......... | 429/22 X |
| 5,877,600 A | * | 3/1999 | Sonntag .................. | 429/23 X |
| 6,180,271 B1 | * | 1/2001 | Stühler et al. ............ | 429/23 X |
| 6,255,008 B1 | * | 7/2001 | Iwase ........................ | 429/9 |

* cited by examiner

*Primary Examiner*—Stephen Kalafut
(74) *Attorney, Agent, or Firm*—Foley & Lardner

(57) ABSTRACT

When a kick-down operation by a driver is detected during the startup of a fuel reforming system, the amount of electrical power required for startup of the fuel reforming system is limited, and the amount of electrical power distributed to a motor is increased, thereby giving priority to powering the motor.

6 Claims, 4 Drawing Sheets

ELECTRICAL POWER
DISTRIBUTION MAP A

ELECTRICAL POWER
DISTRIBUTION MAP B

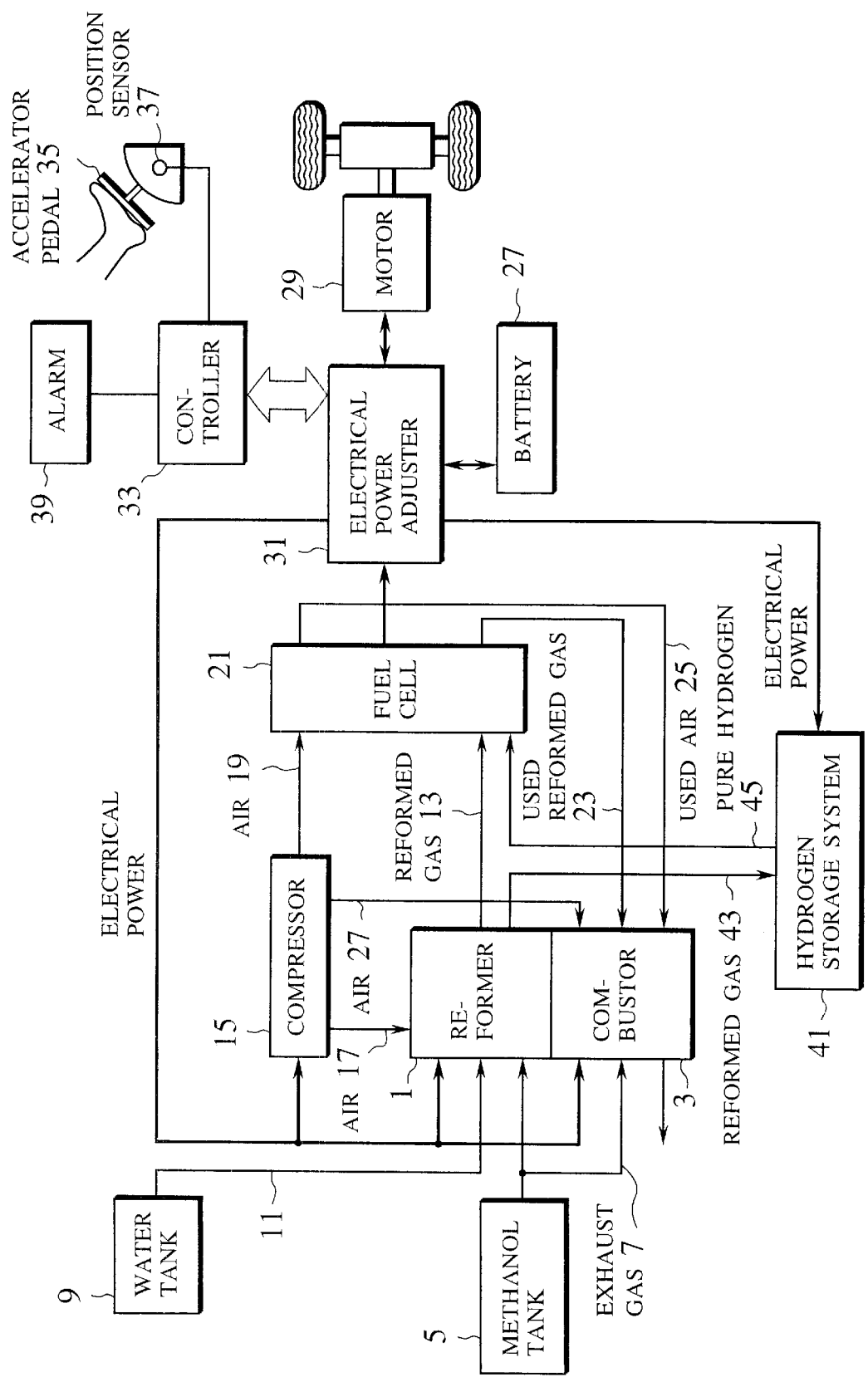

ELECTRICAL POWER DISTRIBUTION SYSTEM FOR A FUEL CELL VEHICLE

BACKGROUND OF THE INVENTION

The present invention relates to an electrical power distribution system for a fuel cell vehicle.

One type of fuel cell vehicle of the past was a hybrid fuel cell vehicle having a fuel cell system with a fuel-reformer and a battery.

In a fuel cell vehicle of this type, the fuel-reformer is usually formed by a fuel reformer and a combustor, reformed gas from the fuel reformer and air from a compressor being used by the fuel cell to generate electrical power, excessively generated electrical power and regeneratively generated electrical power from the motor being stored in the battery. In this system, in response to operation of the acceleration pedal by the driver, electrical power is distributed from the fuel cell and the battery to the motor, the fuel reformer, the combustor, and the compressor, for example, via an electrical power adjuster.

In the above case, when the driver sets the ignition key to on to start up the fuel cell vehicle, because reformed gas is not generated for a period of several minutes to several tens of minutes after the fuel reformer is started, it is not possible for the fuel cell to generate electrical power. Therefore, the power for the motor is taken from the battery.

Thereafter, at the point at which the fuel reformer starts to generate a standard amount of reformed gas that is usable in the fuel cell, electrical generation is started. Because the temperature of the fuel cell has not yet increased at this point, however, it is not possible to generate the rated amount of electrical power.

Subsequently, as electrical power generation continues, heat generated internally in the fuel cell causes a rise in temperature, making it possible to generate the rated amount of electrical power.

SUMMARY OF THE INVENTION

In a fuel cell vehicle system of the past, however, a large amount of electrical power was required to start the fuel reformer and reform fuel.

More specifically, in order to start the fuel reformer and reform fuel, because the heat generated by the combustor is re-used in vaporizing the fuel and absorbed in the fuel reforming reaction, there is a need to start the combustor as well. To start the fuel reformer that performs a chemical reaction, it is necessary to reach a prescribed temperature, for example approximately 300° C. in the case of steam reforming, thereby requiring a large amount of energy, which is difficult to supply from only a battery.

For this reason, the thermal energy generated when the methanol fuel is combusted is used to raise the temperature of the fuel reformer. When this is done, however, the catalyst experiences meltdown at the high temperatures that occur. Given this situation, in order to achieve combustion at an appropriately high temperature, it is necessary to supply a large amount of air using a compressor, thereby increasing the amount of electrical power required.

In vaporizing the methanol, it is necessary at the startup stage to use an electrical vaporizer, and because of the large latent heat of methanol, the amount of electrical power required for this is large. Additionally, an electrical heater (catalyst heater) is required to bring the temperature to the minimum temperature for ignition of the catalyst, and this also requires a large amount of electrical power.

Thus, the amount of electrical power required for starting a fuel reforming system is extremely large, this being approximately equivalent to the amount of electrical power consumed in operating the fuel cell vehicle over a flat terrain at a high speed. Under these conditions, if the electrical power and capacity of the battery is sufficient to cover the added amount of electrical power required to start up the fuel cell system in addition to the standard amount of energy required for operating the electrical vehicle, during the period until it becomes possible to generate the standard amount of reformed gas usable in the fuel cell, it is possible to supply sufficient power from the battery.

However, a situation can be envisioned in which it is not possible for space and cost considerations to mount in the vehicle both fuel cell system including a fuel reforming system and such a large-capacity battery. Thus, limitation of the battery container size is inevitable, thereby making it difficult to supply sufficient electrical power to run the motor before it is possible to generate the standard amount of reformed gas for use in the fuel cell.

Thus, in a fuel cell vehicle system of the past, in the period of several minutes to several tens of minutes up until the point at which it is possible for the fuel reforming system to generate sufficient reformed gas for use by the fuel cell, a large amount of electrical power is required to start the fuel reforming system, and hence the fuel cell system as a whole. This made it impossible to obtain sufficient electrical power from the battery to run the motor, making it impossible to achieve sufficient running performance.

Accordingly, in view of the above-described problems with the related art, it is an object of the present invention to provide an electrical power distribution system for a fuel cell vehicle capable of achieving sufficient running performance during startup of the fuel reforming system.

An aspect of the present invention to achieve the object is an electrical power distribution system for a fuel cell vehicle, comprising a fuel reformer generating reformed gas from fuel, an air supply source supplying air, a fuel cell generating electrical power from the reformed gas and the air, a battery storing electrical power generated by the fuel cell and discharging electrical power, and an electrical motor providing drive to the vehicle by electrical power supplied from the fuel cell and the battery, wherein the electrical power distribution system is operative in response to operation of an accelerator for distribution of electrical power from the fuel cell and the battery to the fuel reformer, the air supply source, and the motor, and further comprises an operation detector detecting a kick-down operation of an accelerator pedal, and a controller which in the case of a kick-down operation being detected during startup of the fuel reforming system, including the fuel reformer and the air supply source, performs control so as to limit the electrical power required for startup of the fuel reforming system and increase the amount of electrical power distributed to the motor.

In this aspect the present invention, by detecting the kick-down operation of the accelerator pedal, it is possible to limit the electrical power required for starting and increase the power distributed to the motor, thereby giving priority to the motor, and achieving sufficient running performance during the startup of the fuel reforming system.

BRIEF DESCRIPTION OF THE DRAWINGS

The above and further objects and novel features of the present invention will more fully appear from the following detailed description when the same is read in conjunction with the accompanying drawings, in which:

FIG. 6 is a system block diagram showing the system in a fuel cell vehicle in which an electrical power distribution system for a fuel cell vehicle according to a first embodiment of the present invention is installed.

DESCRIPTION OF THE PREFERRED EMBODIMENTS

Preferred embodiments of the present invention are described in detail below, with reference made to relevant accompanying drawings.

Figure 1:
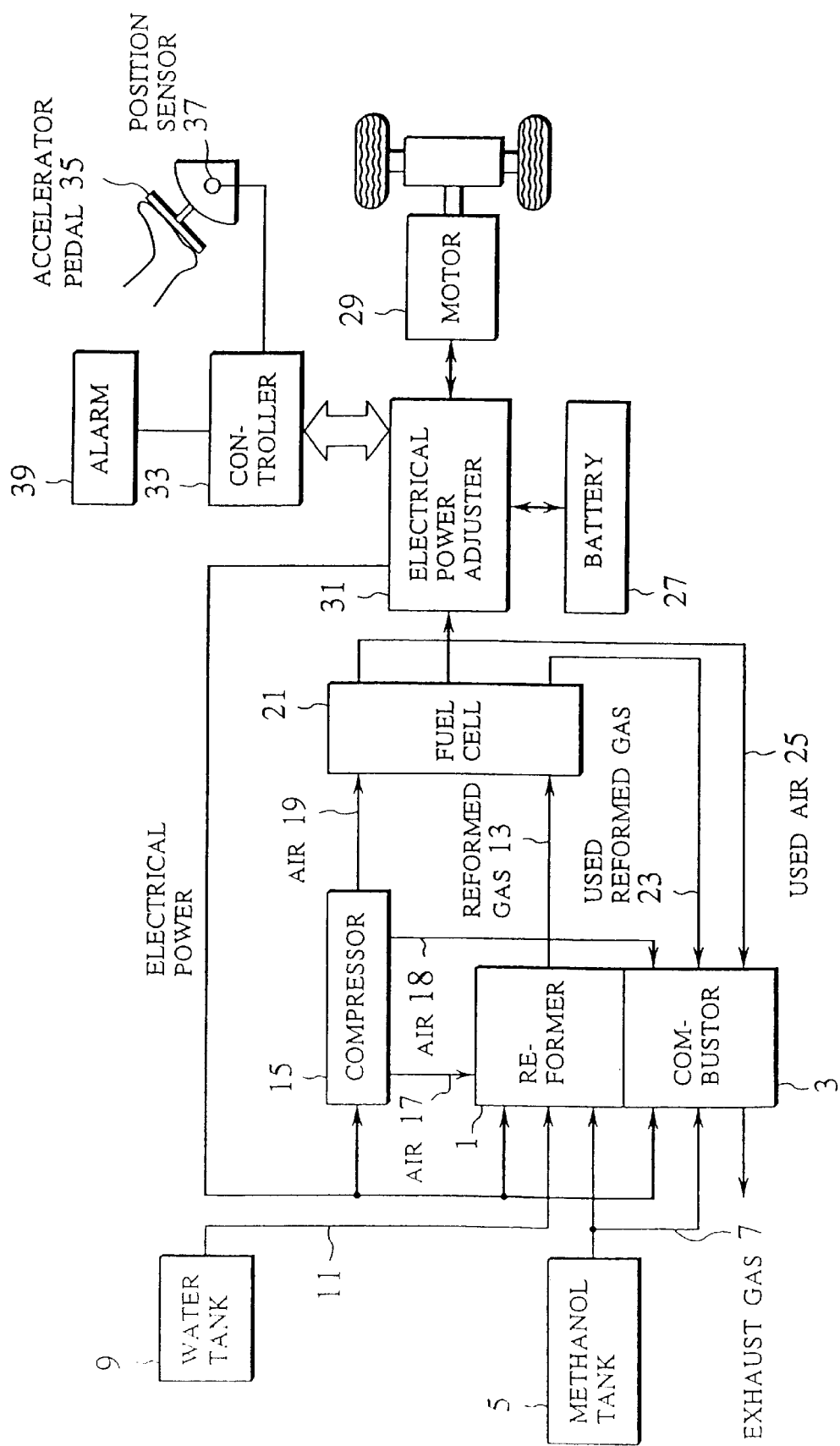
FIG. 1 is a system block diagram showing the system in a fuel cell vehicle in which an electrical power distribution system for a fuel cell vehicle according to a first embodiment of the present invention is installed.

The fuel cell vehicle system shown in FIG. 1 is a hybrid fuel cell vehicle having a battery and a fuel cell system with a fuel reformer.

The fuel reformer has a fuel reformer 1 and a fuel combustor 3. The fuel reformer 1 performs steam conversion of methanol 7 fuel stored in a methanol tank 5 using water 11 from a water tank 9 thereby generating reformed gas 13 that includes hydrogen. When this is done, there are cases in which reforming is performed by partial oxidation of the methanol 7 using the air 17 supplied by a compressor 15. Steam reforming is an endothermic reaction, and the partial oxidation is an exothermic reaction.

The reformed gas 13 from the fuel reformer 1 and the air 19 from the compressor 15 are feed to the anode and cathode electrodes, respectively, of the fuel cell 21, electrical power being generated by using the hydrogen in the reformed gas 13 and the oxygen in the air 19. The hydrogen in the reformed gas 13 and the oxygen in the air 19 are not completely consumed within the fuel cell 21, one part remaining and being exhausted, this being fed to the fuel combustor 3 as used reformed gas 23 and used air 25, and in some cases combustion will take place along with air 18 from the compressor 15 and methanol 7 from the methanol tank 5. The heat of combustion in the fuel combustor 3 vaporizes the methanol 7 and the water 11, so that it can be re-used in the above-noted endothermic steam reforming reaction.

A battery 27 stores excessive electrical energy generated by the fuel cell 21 and electrical energy generated by regeneration in a motor 29 when the fuel cell vehicle is decelerating. If the fuel cell 21 cannot generate sufficient energy to supply energy consumed by the motor 29 in operating the vehicle, and by auxiliary equipment such as the compressor 15 and the fuel combustor 3, the battery 27 discharges to make up for this insufficiency.

The distribution of electrical power to the motor 29 and auxiliary equipment (such as the compressor 15, the fuel reformer 1, and the fuel combustor 3), this being the distribution between running motive power and auxiliary equipment, is performed by the electrical power adjuster 31. A controller 33 controls the electrical power distribution by the electrical power adjuster 31 by a detection signal generated by a position sensor 37 for detecting the amount of depression of an accelerator pedal 35 (accelerator opening) by the driver and the vehicle speed.

As noted above, when the driver sets the ignition key to on and starts driving the fuel cell vehicle, because there is no reformed gas generated in a time period of several minutes or several tens of minutes required for the start of the fuel reformer 1, it is not possible for the fuel cell 21 to generate electricity. The motive power of the motor is therefore derived mainly from the battery 27. Thereafter, when the fuel reformer 1 becomes capable of generating a standard amount of reformed gas for use by the fuel cell 21, the fuel cell starts to generate electricity. Because at this point the temperature of the fuel cell 21 has not yet risen, it is not yet possible to generate the rated amount of electrical power. If electrical generation is further continued, the temperature of the fuel cell 21 is raised by the heat generated therein, so that the prescribed temperature is reached at which it becomes possible to generate the rated amount of electrical power.

Figure 2:
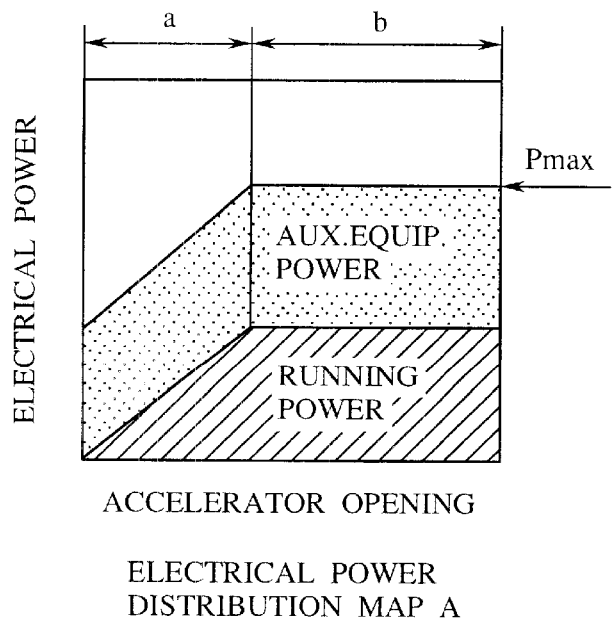
FIG. 2 is a conceptual graph showing an electrical power distribution map of a battery during normal running.

The mapping of battery power distribution during normal driving is shown FIG. 2 as the electrical power distribution map A. This map is stored as a table in an internal ROM in the controller 33.

During normal driving, the controller 33 controls distribution of electrical power in accordance with the electrical power distribution map A. In FIG. 2, Pmax denotes the maximum electrical power that can be supplied from the battery. As the driver presses down on the accelerator pedal 35, first there is an increase in the electrical power supplied as motive power to the motor 29 (region a), and if the overall total of the electrical power required to run the motor 29 and required by auxiliary equipment, such as the compressor 15, the fuel reformer 1, the fuel combustor 3, the catalyst heater (not shown in the drawing), and an electrical vaporizer (not shown in the drawing) required to start up the fuel reforming system reaches Pmax, subsequent further depression of the accelerator pedal 35 is ignored, a constant electrical power being supplied to the motor 29 (region b). The maximum acceleration in this condition is limited.

Figure 3:
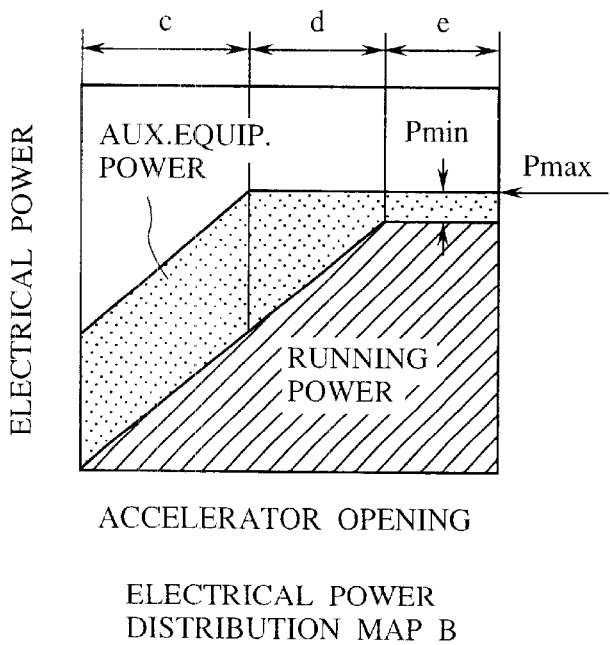
FIG. 3 is a conceptual graph showing an electrical power distribution map of a battery when kick-down is detected.

FIG. 3 is a conceptual presentation, as map A, of the mapping of electrical power distribution when a kick-down event is detected. Similar to the case of map A, this electrical power distribution map B is stored as a table in an internal ROM in the controller 33.

When a kick-down operation of the accelerator pedal 35 detected, the controller 33 performs electrical power distribution control according to map B. Specifically, as the driver depresses the accelerator pedal 35, at first, similar to the case of map A, the electrical power supplied as motive power to the motor 29 is increased (region c).

However, if the total of the electrical power required to run the motor 29, and required by auxiliary equipment such as the compressor 15, the fuel reformer 1, the fuel combustor 3, the catalyst heater (not shown in the drawing), and the electrical vaporizer (not shown in the drawing) required to start up the fuel reforming system reaches Pmax, a transition is made thereafter to the electrical power distribution map A, in which the electrical power required by auxiliary equipment such as the fuel reformer 1, the fuel combustor 3, the catalyst heater (not shown in the drawing), and the electrical vaporizer (not shown in the drawing) required to start up the fuel reforming system is lowered to a low level of power without stopping the fuel reforming system, for example, by limiting the power, in accordance with the accelerator opening, to a minimum electrical power Pmin at which the catalyst combustion in the catalytic converter is not extinguished (region d).

Thereafter, further opening of the accelerator is ignored, a constant electrical power being supplied to the motor 29 (region e). In this condition, it is possible to achieve sufficient acceleration.

Figure 4:
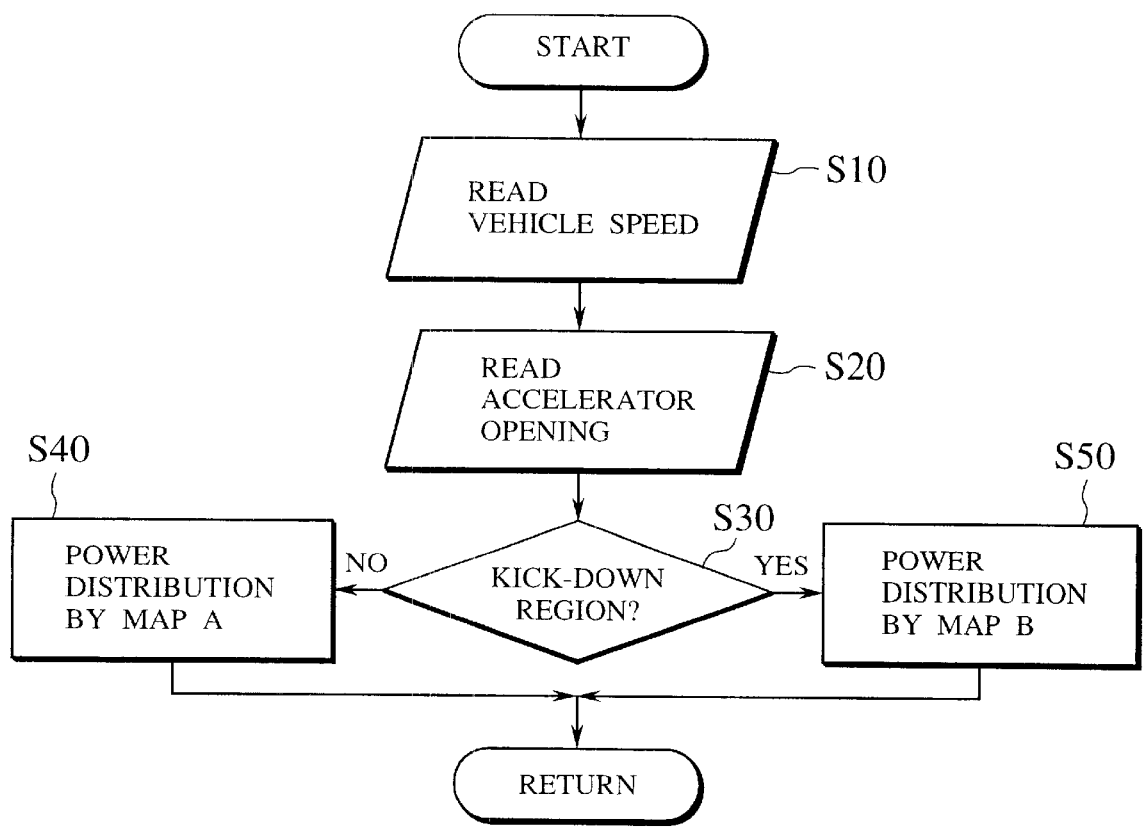
FIG. 4 is a control flowchart illustrating control operation in an electrical power distribution system of a fuel cell vehicle according to the first embodiment of the present invention.
Figure 5:
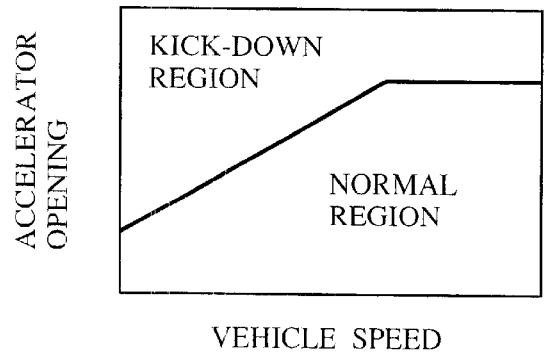
FIG. 5 is a conceptual drawing showing a kick-down detection map.

Referring to the kick-down detection map of FIG. 5, the control operation of the electrical power distribution system of a fuel cell vehicle in accordance with the flowchart of FIG. 4 is as follows. The control flowchart of FIG. 4 and the kick-down detection map of FIG. 5 are stored as a control program and a data table, respectively, in an internal ROM of the controller 33.

First, at step S10, the controller 33 reads in the vehicle speed from a vehicle speed sensor mounted to a motor controller or wheel (not shown in the drawing). At step S20, with opening of the accelerator accompanying depression of the accelerator pedal 35, a test is made as to whether the kick-down region shown in FIG. 5 has been entered. That is, the test of whether or not the vehicle driver has performed a kick-down operation is made in accordance with the map of FIG. 5 relating the accelerator opening to the vehicle speed. As shown in FIG. 5, a kick-down operation is judged to have occurred if a given accelerator opening for the current vehicle speed is exceeded.

At step S30, if the kick-down region has not been entered, control proceeds to step S40, at which the controller 33, performs control of the electrical power adjuster 31 according to the electrical power distribution map A of FIG. 2, resulting in the normal driving mode.

If the kick-down region is detected at step S30, however, control proceeds to step S50, at which a switch is made from the electrical power distribution map A to the electrical power distribution map B, so that the electrical power adjuster 31 performs control in accordance with the electrical power distribution map B of FIG. 3.

When this occurs, depending upon the timing of distribution of electrical power according to the electrical power distribution map B, because the power required for auxiliary equipment in starting up the fuel reforming system is limited, the amount of time required to start the fuel reforming system becomes long. For this reason, if the kick-down operation is performed a large number of times in the condition in which the fuel reforming system has not yet started, in an extreme case it is possible that the battery be completed depleted before the fuel reforming system is started.

Given the above, if detection is made that there is insufficient power to start the fuel reforming system, and in response to this detection priority is given to distributing electrical power to the motor 29, in accordance with the electrical power distribution map B, when this electrical power exceeds a pre-established amount, the driver of the vehicle can be warned of the fact that there is insufficient power to start the fuel reforming system by an alarm device 39.

As a result, the first embodiment of the present invention achieves the effect of increasing the amount of electrical power that is distributed to the motor 29 by limiting the electrical power required for starting the fuel reforming system when detection is made of an accelerator pedal kick-down. Thus, by making priority distribution of electrical power to the motor 29, as shown in FIG. 3, it is possible to achieve sufficient running performance of the vehicle even during startup of the fuel reforming system.

When detection is made of insufficient electrical power to start the fuel reforming system, by warning the driver of this condition, the driver can be prompted to take appropriate action, thereby preventing depletion of the battery before starting the fuel reforming system.

The system block diagram of FIG. 6 shows the system of a fuel cell vehicle in which an electrical power distribution system for a fuel cell vehicle according to the second embodiment of the present invention is installed. In the second embodiment, the basic configuration is the same as the first embodiment, corresponding elements of the second embodiment have been assigned the same reference numerals as in the first embodiment, and are not explicitly described herein.

A feature of the second embodiment is the provision of a hydrogen storage system 41, which stores hydrogen contained in the reformed gas generated by the fuel reformer 1, and as necessary sends pure hydrogen 45 to the fuel cell 21. The hydrogen storage system 41, in addition to compensating for a delay in the response of the fuel reforming system, enables operation of the fuel cell during the startup of the fuel reforming system.

A number of types of hydrogen storage systems 41 can be envisioned, depending upon the method of hydrogen storage employed. In the case in which the reformed gas 43 is compressed and stored in a high-pressure tank, the hydrogen storage system 41 in this case being formed by a high-pressure tank and a compressor. In this case, the reference numeral 45 denotes not pure hydrogen, but rather reformed gas. In the case in which a hydrogen-occluding alloy is used, the hydrogen storage system 41 is formed by a hydrogen purifying apparatus for extracting pure hydrogen from the reformed gas 43, a tank containing a hydrogen-occluding alloy, and a heater for heating the hydrogen extracted from the hydrogen-occluding alloy.

Using this type of hydrogen storage system 41, even during the startup of the fuel reforming system, it is possible to generate some amount of electrical power using the fuel cell 21, so that electrical power in the electrical power distribution map A of FIG. 2 used in describing the first embodiment and in the electrical power distribution map B shown in FIG. 3, can be distributed in the same manner as in the first embodiment, the electrical power from the fuel cell 21 being added to the electrical power of the battery 27. In this case, if the hydrogen storage system 41 has been started, the amount of electricity generated is generally greater than the amount required by the auxiliary equipment to generate electrical power by the hydrogen storage system 41. For this reason, when detection is made that the driver has kicked the accelerator pedal 35 down, there is no need to limit the auxiliary equipment power required to generate electrical power.

In contrast to the above, if during the startup of the hydrogen storage system 41, during which hydrogen-occluding alloy is cold and sufficient electrical power generation is not yet possible, if accelerator kick-down by the driver is detected, the power required to start the hydrogen storage system 41 is limited, the same as the electrical power required to start the fuel reforming system.

As a result, according to the second embodiment, even if an accelerator pedal kick-down is detected during the startup of the fuel cell, as long as the hydrogen storage system 41 has been started up, by not limiting the electrical power required for operation of the hydrogen storage system 41, even during startup of the fuel reforming system it is possible to generate some electrical power by the fuel cell 21, thereby enabling sufficient running performance even during the startup of the fuel reforming system.

It will be understood that the present invention is not restricted to the above exemplary embodiments, and can take a variety of forms within the spirit of the invention as recited in the accompanying claims, such as described below.

For example, although the first and second embodiments were described above for the case in which a kick-down operation of the accelerator pedal 35 by the driver is detected using the map relating vehicle speed and accelerator opening shown in FIG. 5, the present invention is not restricted in this manner, and can also, for example, use a map or algorithm that makes this detection possible by relating the speed of accelerator pedal depression and the vehicle speed or a signal from an accelerator pulse switch.

Additionally, although the first and second embodiments were described for the case in which, when a kick-down operation of the accelerator pedal 35 by the driver is detected, the electrical power required for startup of the fuel reforming system is limited, the present invention is not restricted in this manner. For example, it is possible to limit the electrical power for air conditioning, by setting the air conditioner to off, and to provide three types of electrical power distribution maps, so that when an accelerator kick-down operation is detected from the accelerator opening and the vehicle speed, the electrical power required for the startup of the fuel reforming system is limited, and further when the speed of depression of the accelerator pedal 35 exceeds a prescribed value, to switch the air conditioner to off.

While the first and second embodiments were described for the case of controlling the power distribution from the main power battery, the present invention is not restricted in this many either. For example, in a hybrid fuel cell vehicle having a running battery, because it is necessary to set a main power battery relay to on to start the main power system, there is generally a 12-V or 24-V battery, similar to a conventional vehicle, used as an auxiliary battery, and the present invention can be applied to controlling the power distribution with respect to the auxiliary battery as well. For example, when the accelerator is fully opened, it is possible in this case to power such devices as headlights and directional signals from the auxiliary battery.

Additionally, while the first and second embodiments were described for the case of electrical power distribution during startup of a fuel reforming system, the present invention is not restricted in this manner. For example, it is also possible to apply to present invention to the case in which during warm-up of the fuel cell 21, it possible to generate some electrical power but not as much as the rated amount of electrical power.

In an aspect of the foregoing embodiments, a hydrogen storage system is provided for storing hydrogen contained in the reformed gas generated by the fuel reformer, wherein after the hydrogen storage system is started, the controller does not limit the electrical power required for operation of the hydrogen storage system, and wherein during startup of the hydrogen storage system, the controller limits the electrical power required for startup of the hydrogen storage system. Therefore, even if a kick-down operation of the accelerator pedal is detected during startup of the fuel reforming system, if the hydrogen storage system has already been started up, the power required for operation of the hydrogen storage system is not limited, so that even during startup of the fuel reforming system it is possible to generate some amount of electrical power by the fuel cell, relying on the hydrogen storage system, thereby enabling the achieving of sufficient running performance even during startup of the fuel reforming system.

In another aspect, an electrical power detector is provided for detecting insufficient electrical power for starting of the fuel reforming system, and an alarm provided for issuing an alarm, in response to a detection result from the electrical power detector, to the effect that electrical power is insufficient to start the fuel reforming system. Accordingly, when detection is made of insufficient electrical power to start up the fuel reforming system, the driver is warned of this condition, thereby prompting the driver to take appropriate action, thereby preventing depletion of the battery before the fuel reforming system is started up.

The contents of Japanese Patent Application No. 11-126040 are incorporated herein by reference.

While preferred embodiments of the present invention have been described using specific terms, such description is for illustrative purposes, and it is to be understood that changes and variations may be made without departing from the spirit or scope of the following claims.

What is claimed is:

1. An electrical power distribution system for a fuel cell vehicle, comprising:
   a fuel reformer generating reformed gas from fuel, wherein the fuel reformer comprises an electrical vaporizer;
   an air supply source supplying air to the fuel reformer and to a fuel cell;
   the fuel cell generating electrical power from the reformed gas and the air;
   a battery storing electrical power generated by the fuel cell and discharging electrical power; and
   an electrical motor providing drive to the vehicle by electrical power supplied from the fuel cell and the battery,
   wherein the electrical power distribution system is operative in response to operation of an accelerator for distribution of electrical power from the fuel cell and the battery to the fuel reformer, the air supply source, and the motor, and further comprises:
   an operation detector detecting a kick-down operation of an accelerator pedal; and
   a controller which in the case of a kick-down operation being detected during startup of the fuel reforming system, including the fuel reformer and the air supply source, performs control so as to limit the electrical power required for startup of the fuel reforming system and increase the amount of electrical power distributed to the motor.

2. An electrical power distribution system according to claim 1, further comprising a hydrogen storage system storing hydrogen contained in the reformed gas generated by the fuel reformer, wherein after the hydrogen storage system is started, the controller does not limit the electrical power required for operation of the hydrogen storage system, and wherein during startup of the hydrogen storage system, the controller limits the electrical power required for startup of the hydrogen storage system.

3. An electrical power distribution system according to claim 1, further comprising:
   an electrical power detector detecting insufficient electrical power for starting of the fuel reforming system; and
   an alarm provider issuing an alarm, in response to a detection result from the electrical power detector, to the effect that electrical power is insufficient to start the fuel reforming system.

4. The electrical power distribution system according to claim 1, wherein the air supply source comprises a compressor.

5. An electrical power distribution system for a fuel cell vehicle, comprising:
- a fuel reformer generating reformed gas from fuel, wherein the fuel reformer comprises an electrical vaporizer;
- an air supply source supplying air to the fuel reformer and to a fuel cell;
- the fuel cell generating electrical power from the reformed gas and the air;
- a battery storing electrical power generated by the fuel cell and discharging electrical power; and
- an electrical motor providing drive to the vehicle by electrical power supplied from the fuel cell and the battery, wherein the electrical power distribution system is operative in response to operation of an accelerator for distribution of electrical power from the fuel cell and the battery to the fuel reformer, the air supply source, and the motor, and further comprises:
- operation detecting means for detecting a kick-down operation of an accelerator pedal; and
- control means operative in the case of a kick-down operation being detected during startup of the fuel reforming system, including the fuel reformer and the air supply source, for performing control so as to limit the electrical power required for startup of the fuel reforming system and increase the amount of electrical power distributed to the motor.

6. The electrical power distribution system according to claim 5, wherein the air supply source comprises a compressor.

* * * * *